(12) United States Patent
Beier et al.

(10) Patent No.: US 8,915,336 B2
(45) Date of Patent: Dec. 23, 2014

(54) BRAKE

(75) Inventors: Peter Beier, Wunstorf (DE); Gerhard Bruns, Hannover (DE); Olaf Jantz, Hannover (DE); Hartmut Rosendahl, Hannover (DE)

(73) Assignee: WABCO GmbH, Hannover (DE)

( * ) Notice: Subject to any disclaimer, the term of this patent is extended or adjusted under 35 U.S.C. 154(b) by 291 days.

(21) Appl. No.: 13/120,452

(22) PCT Filed: Jul. 1, 2009

(86) PCT No.: PCT/EP2009/004740
§ 371 (c)(1),
(2), (4) Date: May 10, 2011

(87) PCT Pub. No.: WO2010/034366
PCT Pub. Date: Apr. 1, 2010

(65) Prior Publication Data
US 2011/0220440 A1    Sep. 15, 2011

(30) Foreign Application Priority Data

Sep. 29, 2008 (DE) .................. 10 2008 049 239

(51) Int. Cl.
*F16D 65/18* (2006.01)
*F16D 121/24* (2012.01)
*F16D 125/64* (2012.01)
*F16D 127/08* (2012.01)
*F16D 127/10* (2012.01)

(52) U.S. Cl.
CPC ............ *F16D 65/18* (2013.01); *F16D 2121/24* (2013.01); *F16D 2125/64* (2013.01); *F16D 2127/08* (2013.01); *F16D 2127/10* (2013.01)

USPC .................. 188/72.2; 188/72.8; 188/70 B

(58) Field of Classification Search
CPC . F16D 65/18; F16D 2121/24; F16D 2127/08; F16D 2127/10
USPC ................... 188/72.2, 72.7, 70 R, 70 B
See application file for complete search history.

(56) References Cited

U.S. PATENT DOCUMENTS

| 3,367,452 | A |   | 2/1968 | Baynes |             |
|-----------|---|---|--------|--------|-------------|
| 3,869,024 | A | * | 3/1975 | Hauth et al. | 188/72.5 |
| 4,444,296 | A | * | 4/1984 | Marianu | 188/72.2 |
| 4,852,699 | A | * | 8/1989 | Karnopp et al. | 188/72.2 |
| 7,086,505 | B2 | * | 8/2006 | Mackiewicz | 188/72.2 |
| 8,047,338 | B2 | * | 11/2011 | Baumann | 188/72.2 |
| 2008/0257660 | A1 | * | 10/2008 | Miller | 188/72.1 |

FOREIGN PATENT DOCUMENTS

| DE | 32 30 583 |     | 2/1984 |
|----|-----------|-----|--------|
| DE | 102005049786 A1 | * | 4/2007 |
| DE | 10 2006 020 850 |   | 11/2007 |
| GB | 2 096 257 |     | 10/1982 |

* cited by examiner

*Primary Examiner* — Bradley King
(74) *Attorney, Agent, or Firm* — Kramer Levin Naftalis & Frankel LLP

(57) ABSTRACT

A brake includes a brake shoe, an actuating element for pressing the brake shoe against a brake disc, and at least one lever disposed such that it increases the braking force applied by the brake shoe to the brake disc by deflecting a tangential force acting on the brake shoe during braking. The actuating element comprises at least one brake disc side part, an actuator side part, and a coupling part disposed between the brake disc side part and the actuator side part, wherein the coupling part can be pivoted relative to the brake disc side part and/or the actuator side part.

15 Claims, 4 Drawing Sheets

BRAKE

FIELD OF THE INVENTION

The present invention generally relates to embodiments of a brake having a brake pad, an actuating element for pressing the brake pad against a brake disk and at least one lever arranged such that it increases a braking force imparted by the brake pad to the brake disk by diverting a tangential force that acts on the brake pad during braking.

BACKGROUND OF THE INVENTION

In conventional brakes, a primary braking force or actuator force is imparted by an actuator to the actuating element such that the brake pad is pressed against the brake disk. When the brake pad comes into contact with the brake disk, a tangential force is generated because the rotating brake disk drags the brake pad with it. This tangential force is diverted by the lever to the actuating element and acts as a secondary braking force or auxiliary force that presses the brake pad against the brake disk to an additional degree.

A disadvantage of this known brake is that, at the time at which the brake pad comes into contact with the brake disk, the tangential force is generated abruptly, which abruptly boosts the primary braking force imparted by the actuator. If a small braking force is to be imparted, a situation may arise in which the actuator initially moves the brake pad toward the brake disk, the brake pad then comes into engagement with the brake disk, the tangential force is diverted by the lever and then boosts the brake force to a value considerably higher than the desired braking force. The actuator must thereupon move the brake pad away from the brake disk, the tangential force decreases suddenly and the braking force imparted by the brake pad to the brake disk falls abruptly to a value considerably below the desired braking force. This cycle repeats and leads to a fluctuating braking force.

In other words, the function that relates the braking force (x axis) imparted by the brake pad to the brake disk to the primary braking force imparted by the actuator to the actuating element (y axis) has a discontinuity. If the braking force is to be linearly increased, the actuator must at a certain time apply an abruptly changing primary force to the actuating element. In the region of the discontinuity, it is only possible with a great degree of difficulty to regulate the brake such that the comfort of a vehicle equipped with such a brake is not impaired.

SUMMARY OF THE INVENTION

Generally speaking, it is an object of the present invention to provide a brake that can be regulated more easily.

This object can be achieved using a brake in which the actuating element comprises at least one brake-disk-side part, an actuator-side part and a coupling part arranged between the brake-disk-side part and the actuator-side part, with the coupling part being pivotable relative to the brake-disk-side part and/or relative to the actuator-side part.

This design advantageously makes it possible for the lever to engage on the coupling part, such that when the tangential force acts on the lever, the lever pivots the coupling part relative to the brake-disk-side part and/or actuator-side part such that the spacing between the brake-disk-side part and the actuator-side part is increased. On account of the increasing spacing, the brake-disk-side part pushes the brake pad further in the direction of the brake disk and thus increases the braking force.

Because the coupling part is pivotable, the spacing between the brake-disk-side part and actuator-side part changes only by a very small amount upon the start of engagement between the brake pad and brake disk. This means that the boosting action of the lever at the start of engagement is weakened by the pivoting of the coupling part, and the brake-force-boosting action of the lever first comes into effect gradually with increasing deflection of the lever. If one plots the primary braking force that the actuator must apply to the actuator-side part versus the desired braking force between the brake pad and brake pad, the resulting curve no longer has a discontinuity. As a result, the brake can be controlled or regulated more easily.

It is also advantageous that only a small number of additional components are required in order to obtain the advantage of improved regulability.

Within the context of the present description, the expressions "brake-disk-side part" and "actuator-side part" refer to the kinematic chain of the transmission of the brake force from an actuator, which exerts a force on the actuator-side part, to the brake pad. It is generally the case that the brake-disk-side part is also situated closer to the brake disk than the actuator-side part, though this is not imperative.

The feature whereby the brake-disk-side part, the actuator-side part and the coupling part are pivotably connected to one another should be understood to mean that the design permits a corresponding pivoting movement. For this purpose, it is possible, but not imperative, for the three parts to be connected to one another by means of fixed bearings. It is furthermore expedient for outer regions of the part to be contoured such that the parts are mounted on one another without the need for additional bearings, for example ball bearings. The brake-disk-side part, the actuator-side part and the coupling part may themselves be composed of two or more sub-elements.

In a preferred embodiment, the brake-disk-side part, the actuator-side part and the coupling part are connected to one another such that, when the brake pad comes into contact with the brake disk at the start of a braking operation and the lever diverts the tangential force in order to boost the braking force, the coupling part pivots by a small angle relative to the brake-disk-side part and/or relative to the actuator-side part. The pivoting leads to an increase in the spacing between the brake-disk-side part and actuator-side part.

In a preferred embodiment, the actuator-side part is guided linearly and the lever engages on the coupling part. In this way, a pivoting of the coupling part does not lead to a pivoting of the actuator-side part, and the actuator is preserved.

Furthermore, the brake-disk-side part is preferably mounted such that the coupling part can pivot substantially without the brake-disk-side part pivoting relative to the brake disk. The brake pad is therefore worn uniformly and jamming of the brake is reliably prevented.

In a preferred embodiment, the brake-disk-side part, the actuator-side part and the coupling element are coupled to the lever such that a deflection of the lever by a predefined lever pivot angle, for example 1°, out of a zero position leads to a smaller change in a spacing between the brake-disk-side part and the actuator-side part than a deflection by the same lever pivot angle when the lever is already in a deflected position. In other words, the provision of the coupling part has the effect that a movement of the lever boosts the braking force to a particularly great degree when the lever has already been deflected, whereas the braking force is boosted only to a small degree when the lever is situated close to its zero position. The zero position is the position assumed by the lever when no braking force is imparted.

The brake-disk-side part, the actuator-side part and the coupling part are preferably coupled to one another such that they are pivotable relative to one another by in each case less than 10°. This results in a particularly rigid design of the brake.

To keep production tolerances low, the brake-disk-side part, the actuator-side part and the coupling part can be connected to one another such that they are pivotable relative to one another by more than 0.1° at maximum braking force.

The lever is preferably designed such that a primary braking force applied to the actuator-side part, which could also be referred to as the actuator force, is boosted by a secondary braking force, wherein the primary braking force and the secondary braking force add up to give the braking force. The lever then has, for example, a lever ratio selected such that a coefficient of sliding friction of 0.6 between the brake pad and the brake disk leads to a secondary braking force that is lower than twenty times the primary braking force. In this way, a primary braking force must always be imparted to the actuator-side part in order to generate a braking force. A situation therefore cannot arise in which the brake seizes as a result of excessive feedback.

In a preferred embodiment, the lever is arranged so as to boost the braking force by diverting the tangential force when the brake disk is rotating relative to the brake pad in a first direction, and a second lever is provided that is arranged so as to boost a braking force imparted by the brake pad to the brake disk by diverting the tangential force when the brake disk is rotating relative to the brake pad in a direction opposite to the first direction. The second lever is preferably of the same design as the first lever, but this is not imperative.

Particularly simple mounting is obtained if the lever or the levers have a circular-arc-shaped outer contour in sections and are mounted by means of the contour in a housing of the brake. It is expedient for the brake to be connected to an electric drive such that the brake together with the electric drive forms an electromechanical brake device.

Still other objects and advantages of the present invention will in part be obvious and will in part be apparent from the specification.

The present invention accordingly comprises the features of construction, combination of elements, and arrangement of parts all as exemplified in the constructions herein set forth, and the scope of the invention will be indicated in the claims.

BRIEF DESCRIPTION OF THE DRAWINGS

The invention will be explained in more detail below on the basis of an exemplary embodiment and with reference to the appended drawings, in which.

DETAILED DESCRIPTION OF THE PREFERRED EMBODIMENTS

Figure 1:
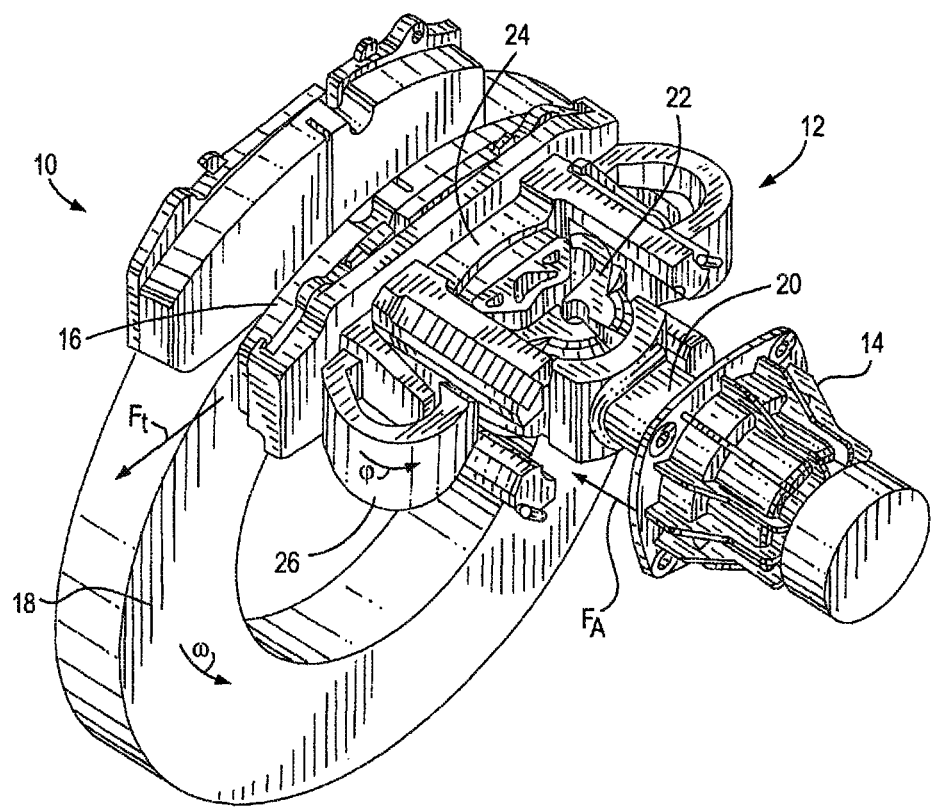
FIG. 1 shows a perspective view of a brake system having a brake in accordance with an embodiment of the present invention.

FIG. 1 shows a brake device 10 having a brake 12 that is actuated by means of an actuator in the form of an electric drive 14. The brake 12 has a brake pad 16 that can be applied against a brake disk 18. For this purpose, the electric drive 14 imparts a primary braking force $F_A$, which could also be referred to as the actuator force, to an actuator-side part 20. The actuator-side part 20 transmits the primary braking force to a coupling part 22, which in turn transmits the primary braking force to a brake-disk-side part 24. The actuator-side part 20, the coupling part 22 and the brake-disk-side part 24 are constituent parts of an actuating element.

If the brake disk 18 is rotating at a rotational speed ω and the brake pad 16 comes into contact with the brake disk 18, then a tangential force $F_t$ is generated. As a result, the brake pad 16 is displaced slightly in the direction of the tangential force $F_t$ and exerts a force on a first lever 26, which thereupon pivots by a lever pivot angle φ.

Figure 2:
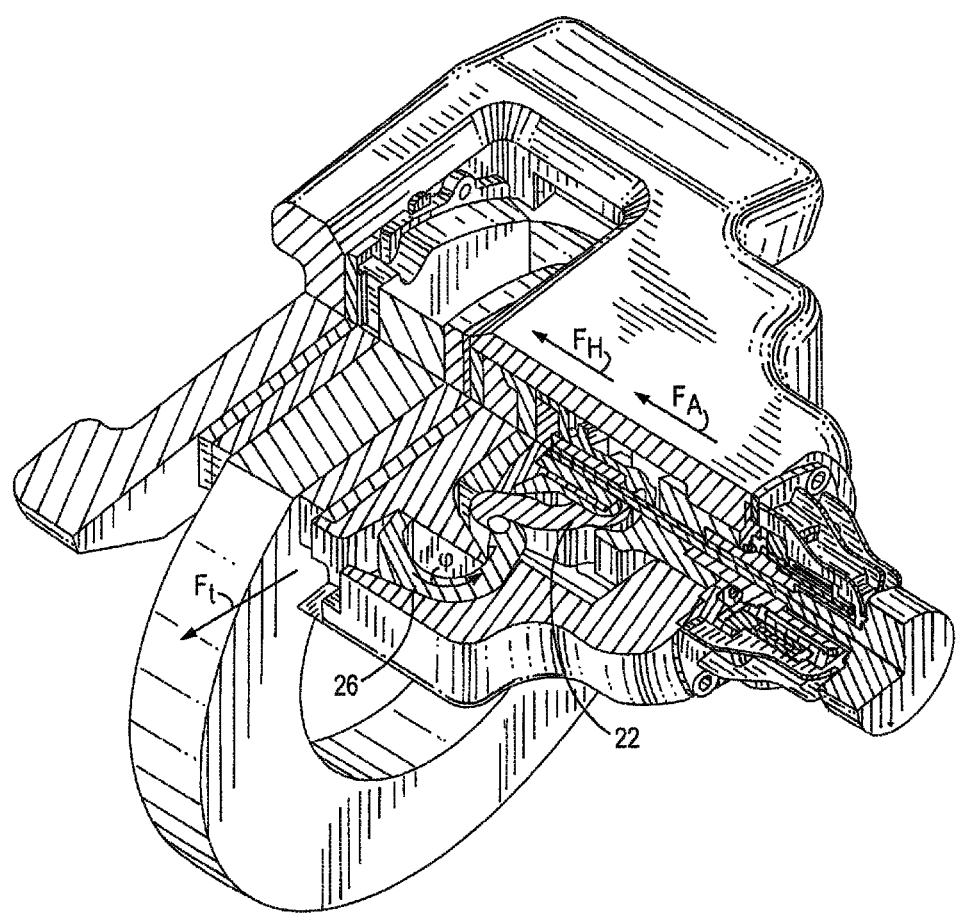
FIG. 2 shows the brake system according to FIG. 1 in a partially cut-away view.

FIG. 2 shows that the first lever 26 then exerts a force on the coupling part 22, such that a secondary braking force $F_H$, which could also be referred to as the auxiliary force, is generated. The secondary braking force $F_H$ points in the same direction as the primary braking force $F_A$ and, together, yield the braking force F. The following relationship therefore applies: $F_A + F_H = F$.

Figure 3:
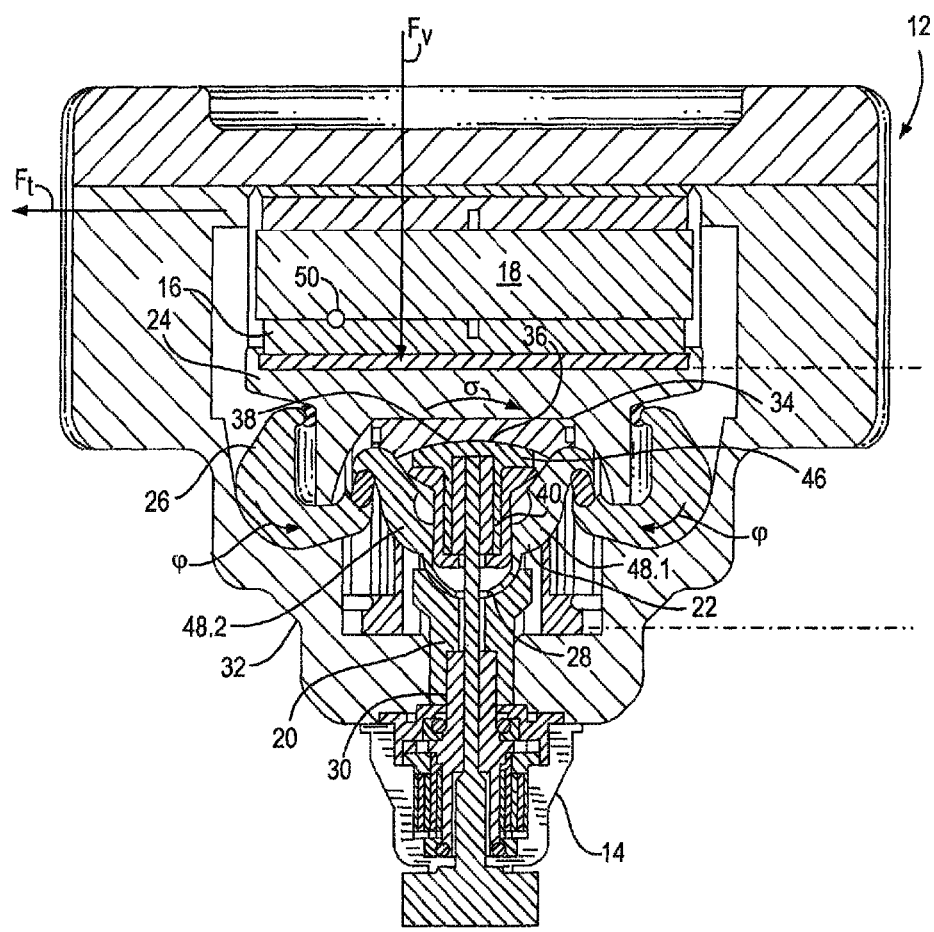
FIG. 3 shows a cross section through the brake according to FIGS. 1 and 2.

FIG. 3 shows that the coupling part 22 is connected via an outer bearing 28 to the actuator-side part 20, such that the coupling part 22 can pivot relative to the actuator-side part 20. If the first lever 26 pivots by a small lever pivot angle φ out of its zero position, then the coupling part 22 pivots relative to the actuator-side part 20 by a small coupling part pivot angle σ, for example of less than 10°. As a result, the coupling part 22 pushes the brake-disk-side part 24 away from itself, such that the brake pad 16 is pressed against the brake disk 18 to an additional degree.

The actuator-side part 20 is guided in a linear guide 30 on a housing 32 of the brake 12, such that no tilting moments act on the electric drive 14. The outer bearing 28 is formed by a joint head, which is formed on the coupling part 22 and which interacts with a joint socket of the actuator-side part 20.

The coupling part 22 has, on its side facing away from the actuator-side part 20, a second joint head 34, which interacts with an associated joint socket 36 of the brake-disk-side part 24 and, with the latter, forms a second outer bearing 38. If the coupling part 22 pivots by the coupling part pivot angle σ out of its zero position, a spacing A between the actuator-side part 20 and the brake-disk-side part 24 is increased, and as a result, the brake pad 16 is pressed against the brake disk 18 to an additional degree. The first lever 26 thereby, together with the coupling part, leads to a boosting of the primary braking force $F_A$.

The coupling part 22 comprises an element 40, which is variable in length and which can be actuated by the electric drive 14 so as to increase the spacing A between the actuator-side part 20 and the brake-disk-side part 24, such that wear of the brake pad 16 can be compensated.

Figure 4:
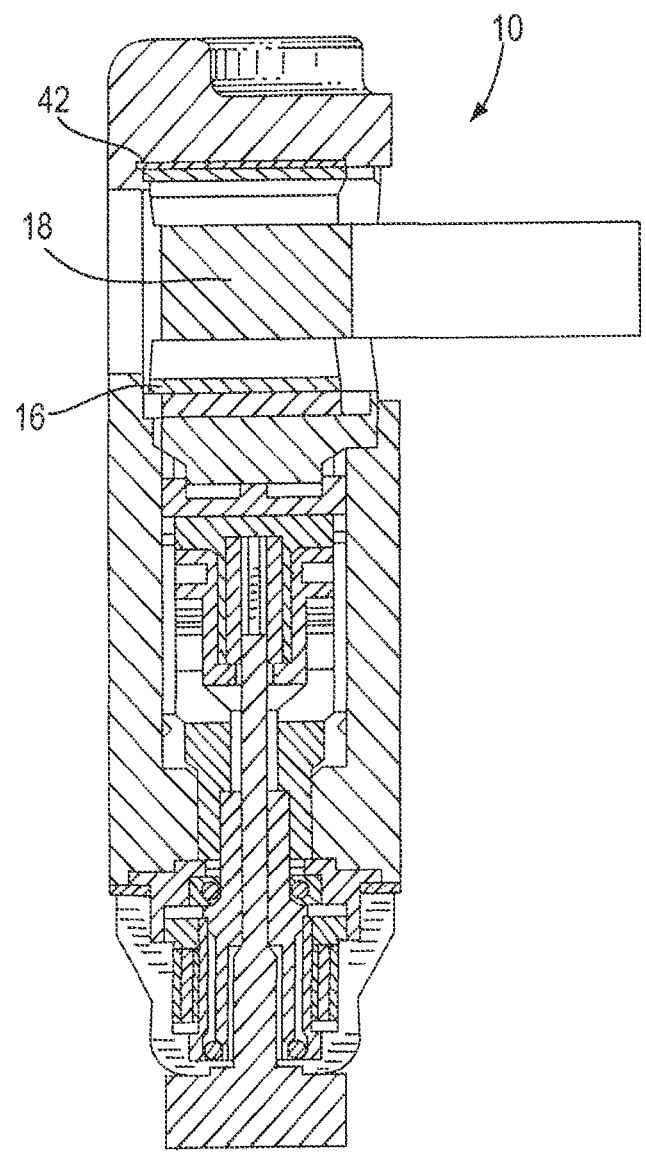
FIG. 4 shows a further section through the brake.

FIG. 4 shows a cross section through the brake device 10, which shows a second brake pad 42 that acts on the brake disk 18 on the side facing away from the first brake pad 16.

FIG. 3 also shows a second lever 44 arranged opposite the first lever 26 that, like the first lever 26, interacts with the coupling part 22. The second lever 44 has the same function as the first lever 26 and acts when the brake disk 18 is rotating with a rotational speed of −ω (cf. FIG. 1). The brake 12 is of symmetrical design with respect to the plane of symmetry shown in FIG. 3.

It can be seen that the coupling part 22 has a first leg 48.1 and a second leg 48.2 that are of mirror-symmetrical design to one another and, with respective head parts, are part of the head bearing 38. The two legs 48.1, 48.2 are arranged at both sides of a wedge element 46 and can pivot relative to the wedge element 46 by an angle, for example of less than 10°.

The two legs 48.1, 48.2 and the wedge element 46 form a rocker that can pivot by a small angle relative to the actuator-side part 20.

The wedge element 46 is arranged relative to the legs 48.1, 48.2 such that a preload force $F_V$ that acts on the brake-disk-side part 20 causes the two legs 48.1, 48.2 to pivot apart slightly. As a result of this pivoting-apart movement, the first lever 26 and the second lever 44 pivot counter to the lever pivot angle γ indicated in FIG. 3, such that they bear under preload against the brake-disk-side part 24.

A preload element can be provided for preloading the brake-disk-side part 24 against the coupling part 22 or against the actuator-side part 20 via the coupling part 22. The preload element can be, for example, a spring. It is sufficient for the spring to impart a preload force of less than 500 N, for example 100 N. Since the brake-disk-side part 24, the coupling part 22 and the actuator-side part 20 are preloaded against one another and the coupling part 22 preloads the levers 26, 44 against the brake-disk-side part 24, all of the components are in a play-free state.

If the actuator-side part 20 is now moved in the direction of the brake disk 18 by the actuator 14, an air play 50 schematically indicated in FIG. 3 by a circle is firstly overcome. The air play amounts to between 0.7 mm and 1.5 mm, for example. When the brake pad 16 comes into contact with the brake disk 18, the tangential force $F_t$ is generated, and on account of the lack of play, a small secondary braking force $F_H$ is generated immediately. The secondary braking force $F_H$ is however small and increases constantly and continuously as the primary braking force $F_A$ increases. In contrast to conventional brakes, therefore, no abrupt boosting of the primary braking force takes place, such that the brake can be controlled or regulated in a particularly effective manner.

It will be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A brake, comprising:
   a brake pad;
   at least one lever disposed proximate the brake pad; and
   an actuating element configured to press the brake pad against a brake disk, the actuating element including at least one brake-disk-side part, an actuator-side part and a coupling part disposed between the at least one brake-disk-side part and the actuator-side part, the at least one lever having a first end coupled to the at least one brake-disk-side part and a second end configured to interact with the coupling part, the coupling part being pivotable relative to at least one of the at least one brake-disk-side part and the actuator-side part, the coupling part being configured to apply a preload force onto the at least one brake-disk-side part during preload by impinging on the second end of the at least one lever such that the first end of the at least one lever bears onto the at least one brake-disk-side part, and the at least one lever being configured to increase a braking force imparted by the brake pad to the brake disk during braking by diverting a tangential force acting on the brake pad directly to the coupling part such that the coupling part pivots and bears onto the at least one brake-disk-side part.

2. The brake as claimed in claim 1, wherein the at least one brake-disk-side part, the actuator-side part and the coupling part are connected to one another such that, when the brake pad contacts the brake disk at the start of a braking operation and the at least one lever diverts the tangential force acting on the brake pad, the coupling part pivots by a small angle relative to at least one of the at least one brake-disk-side part and the actuator-side part.

3. The brake as claimed in claim 1, wherein the actuator-side part is guided linearly and the at least one lever engages the coupling part.

4. The brake as claimed in claim 3, wherein the at least one brake-disk-side part, the actuator-side part and the coupling element are coupled to the at least one lever such that a deflection of the at least one lever by a predefined lever pivot angle out of a zero position effects a smaller change in a spacing between the at least one brake-disk-side part and the actuator-side part than a deflection by the predefined lever pivot angle when the at least one lever is already in a deflected position.

5. The brake as claimed in claim 1, wherein the at least one brake-disk-side part, the actuator-side part and the coupling part are connected to one another such that they are pivotable relative to one another by less than 10°.

6. The brake as claimed in claim 1, wherein the at least one brake-disk-side part, the actuator-side part and the coupling part are connected to one another such that they are pivotable relative to one another by more than 0.1°.

7. A brake, comprising:
   a brake pad;
   at least one lever disposed proximate the brake pad; and
   an actuating element configured to press the brake pad against a brake disk, the actuating element including at least one brake-disk-side part, an actuator-side part and a coupling part disposed between the at least one brake-disk-side part and the actuator-side part, the at least one lever comprising a first lever and a second lever, at least one of the first and second levers having a first end coupled to the at least one brake-disk-side part and a second end configured to interact with the coupling part, the coupling part being pivotable relative to at least one of the at least one brake-disk-side part and the actuator-side part, and the coupling part being configured to apply a preload force onto the at least one brake-disk-side part during preload by impinging on the second end of the at least one of the first and second levers such that the first end of the at least one of the first and second levers bears onto the at least one brake-disk-side part, wherein the first lever is configured to increase a braking force imparted by the brake pad to the brake disk during braking by diverting a tangential force acting on the brake pad such that the coupling part pivots in a first angle when the brake disk is moving relative to the brake pad in a first direction, and wherein the second lever is configured to increase the braking force imparted by the brake pad to the brake disk during braking by diverting the tangential force such that the coupling part pivots in an angle opposite the first angle when the brake disk is moving relative to the brake pad in a direction opposite to the first direction.

8. A brake, comprising:
   a brake pad;
   at least one lever disposed proximate the brake pad; and
   an actuating element configured to press the brake pad against a brake disk, the actuating element including at least one brake-disk-side part, an actuator-side part and a coupling part disposed between the at least one brake-disk-side part and the actuator-side part, the at least one lever having a first end coupled to the at least one brake-disk-side part and a second end configured to interact with the coupling part, the coupling part being pivotable relative to at least one of the at least one brake-disk-side part and the actuator-side part, and the coupling part being configured to apply a preload force onto the at least one brake-disk-side part during preload by impinging on the second end of the at least one lever such that the first end of the at least one lever bears onto the at least one brake-disk-side part, wherein the at least one lever is configured to increase a braking force imparted by the brake pad to the brake disk during braking by diverting a tangential force acting on the brake pad such that the coupling part pivots and bears the at least one brake-disk-side part and the brake pad onto the brake disk, and wherein the at least one lever has a circular-arc-shaped outer contour portion usable to mount the at least one lever in a housing.

9. A brake, comprising:
a brake pad;
an actuating element configured to press the brake pad against a brake disk, the actuating element including at least one brake-disk-side part, an actuator-side part and a coupling part arranged between the brake-disk-side part and the actuator-side part, the coupling part being pivotable relative to at least one of the brake-disk-side part and the actuator-side part; and
at least one lever configured to increase a braking force imparted by the brake pad to the brake disk by diverting a tangential force acting on the brake pad during braking, wherein the brake-disk-side part is preloaded against the actuator side part with a preload force, and the coupling part comprises a wedge element and at least one leg, the wedge element being arranged to divert the preload force such that the at least one lever bears without play against the coupling part.

10. The brake as claimed in claim 9, wherein the wedge element is arranged such that the at least one lever bears without play against the brake-disk-side part.

11. A brake device, comprising a brake as claimed in claim 1; and an electric drive connected to the actuating element to actuate the brake.

12. The brake as claimed in claim 9, wherein the at least one leg includes a first leg and a second leg.

13. The brake as claimed in claim 1, further comprising a preload element coupled to the at least one brake-disk-side part, wherein the preload force is provided by the preload element when the preload element bears the at least one brake-disk-side part onto the coupling part.

14. The brake as claimed in claim 1, wherein the coupling part applies the preload force by pivoting in a first direction during preload, and wherein the coupling part bears onto the at least one brake-disk-side-part during braking by pivoting in a second direction opposite the first direction.

15. The brake as claimed in claim 1, wherein the at least one lever is configured to divert the tangential force by receiving the tangential force at the first end of the at least one lever and applying the received force to the coupling part with the second end of the at least one lever.

\* \* \* \* \*